US008656959B2

(12) United States Patent
Marin et al.

(10) Patent No.: US 8,656,959 B2
(45) Date of Patent: Feb. 25, 2014

(54) HYDRAULIC ACCUMULATOR

(75) Inventors: Carlos E. Marin, Oxford, MI (US); Gary H. Paelicke, Saline, MI (US); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 13/451,047

(22) Filed: Apr. 19, 2012

(65) Prior Publication Data

US 2013/0074967 A1 Mar. 28, 2013

Related U.S. Application Data

(60) Provisional application No. 61/538,286, filed on Sep. 23, 2011.

(51) Int. Cl.
*F16L 55/04* (2006.01)

(52) U.S. Cl.
USPC ........... 138/31; 138/30; 60/413; 303/DIG. 11

(58) Field of Classification Search
USPC ......................................... 138/31, 30; 60/413
See application file for complete search history.

(56) References Cited

U.S. PATENT DOCUMENTS 1,952,916 A * 3/1934 Etten ............................. 137/571
2,780,504 A * 2/1957 Russell ........................... 138/31
4,611,634 A * 9/1986 Kruckewitt et al. ............ 138/31
5,219,000 A * 6/1993 Chalasani et al. .............. 138/31
5,992,948 A * 11/1999 Gowda ....................... 303/116.1
6,065,814 A * 5/2000 Nishii et al. ............... 303/116.1
6,390,133 B1 * 5/2002 Patterson et al. ............... 138/31
6,612,339 B1 * 9/2003 Wilke et al. ..................... 138/31
7,308,910 B2 * 12/2007 Weber ............................ 138/31
7,322,377 B2 * 1/2008 Baltes ............................ 138/31
7,770,599 B2 8/2010 Ota et al.
7,779,629 B2 8/2010 Isono et al.
7,857,006 B2 12/2010 Baltes et al.
2008/0230135 A1 * 9/2008 Weber ............................ 138/31
2010/0193059 A1 8/2010 Nakaoka et al.
2010/0206389 A1 8/2010 Kennedy et al.
2010/0307156 A1 12/2010 Bollinger et al.
2010/0307233 A1 12/2010 Glasson et al.
2010/0313560 A1 12/2010 Koyama
2011/0073191 A1 3/2011 Gray, Jr.
2011/0079140 A1 4/2011 Baseley
2011/0108148 A1 5/2011 Crimpita

* cited by examiner

*Primary Examiner* — Patrick F Brinson

(57) ABSTRACT

A hydraulic accumulator includes a housing with a pair of ends, a piston slidably disposed in the interior of the housing, and a biasing member that urges the piston towards one end of the housing. The accumulator further includes a fluid flow control device in communication with a fluid chamber defined by a face of the piston and the interior surface of the housing. The desired amount of fluid entering and exiting the fluid chamber is controlled by the fluid flow control device according to the desired pressure within the fluid chamber as determined by a pressure sensor which is also in communication with the fluid chamber.

20 Claims, 2 Drawing Sheets

HYDRAULIC ACCUMULATOR

RELATED APPLICATION

This application claims the benefit of U.S. Provisional Application No. 61/538,286, filed Sep. 23, 2011, the entire contents of which are incorporated herein by reference.

FIELD

The present disclosure relates to hydraulic accumulators. More specifically, the present disclosure relates to start-stop hydraulic accumulators.

BACKGROUND

The statements in this section merely provide background information related to the present disclosure and may or may not constitute prior art.

Accumulators are relatively common components in hydraulic circuits and systems. As their name suggests, they are essentially storage devices that accumulate pressurized hydraulic fluid when a supply or flow of hydraulic fluid exceeds the consumption or demand of a system or device. Conversely, when the consumption or demand exceeds supply or flow, the previously stored fluid is exhausted from the accumulator to maintain the desired or necessary pressure or flow.

A typical vehicle powertrain includes an engine and a transmission. In certain powertrains, the engine is selectively turned on and off. That is, as the vehicle comes to a stop, the engine is automatically stopped under a predetermined stop condition, and then, under a predetermined restart condition, the engine is restarted. These powertrains may further include a hydraulic control system with an accumulator that is arranged to discharge a fluid to a torque transmitting device, such as, for example, a clutch when the engine is restarted, to accumulate the fluid when the engine is on, and to retain the fluid when the engine is turned off.

SUMMARY

A hydraulic accumulator includes a housing with a pair of ends, a piston slidably disposed in the interior of the housing, and a biasing member that urges the piston towards one end of the housing. The accumulator further includes a fluid flow control device in communication with a fluid chamber defined by a face of the piston and the interior surface of the housing. The desired amount of fluid entering and exiting the fluid chamber is controlled by the fluid flow control device according to the desired pressure within the fluid chamber as determined by a pressure sensor which is also in communication with the fluid chamber.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
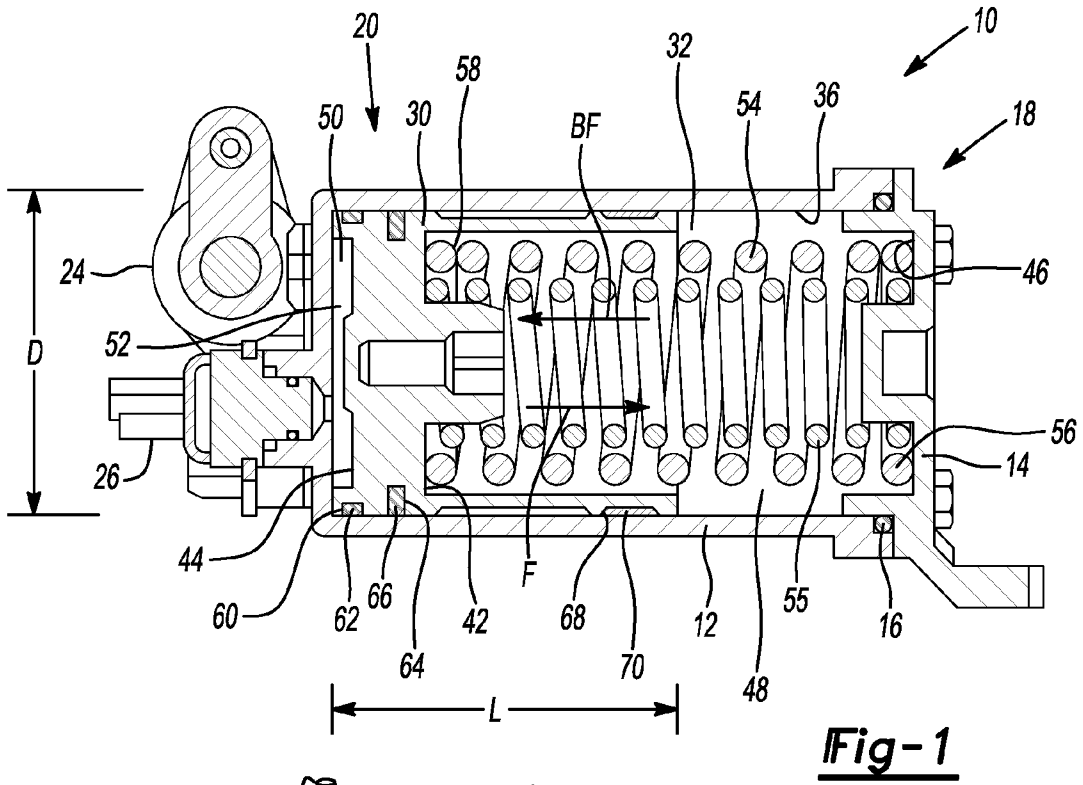
FIG. 1 is a cross-sectional view of a hydraulic accumulator in accordance with the principles of the present invention.
Figure 2:
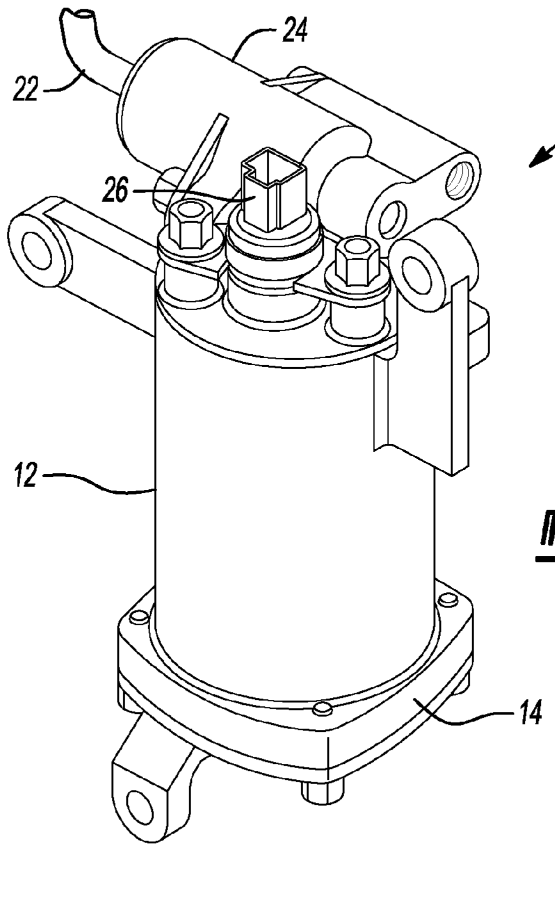
FIG. 2 is a perspective view of the hydraulic accumulator.
Figure 3:
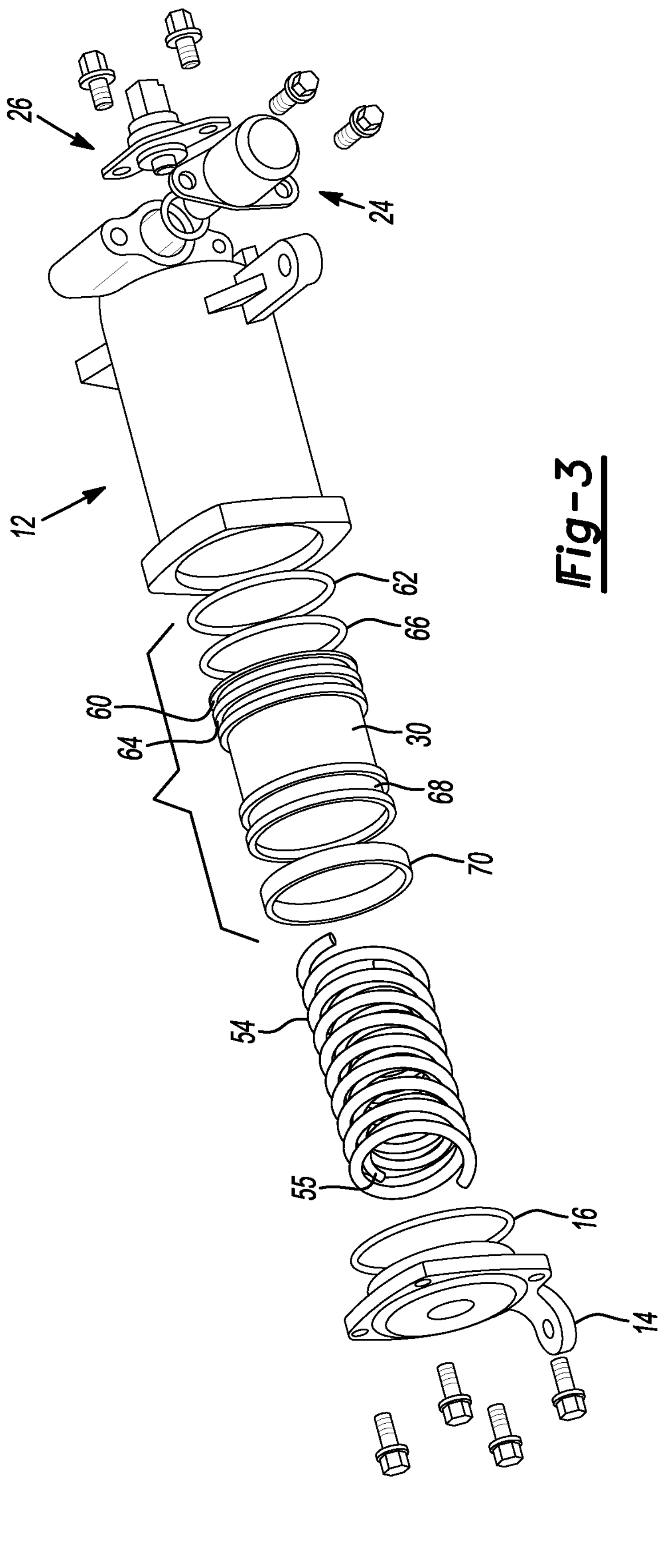
FIG. 3 is an exploded view of the hydraulic accumulator.

Referring now to the drawings, a hydraulic accumulator embodying the principles of the present invention is illustrated in FIGS. 1 through 3 and designated as 10. The accumulator 10 is an energy storage device in which a non-compressible hydraulic fluid is held under pressure by an external source. In one exemplary embodiment, the accumulator 10 is positioned in a hydraulic control system of an automatic transmission, where a pump is operatively connected to an engine or a prime mover for supplying hydraulic fluid to the transmission when the engine is operating, and is idle when the engine is turned off. The accumulator 10 collects hydraulic fluid when the engine or a prime mover is operating, retains hydraulic fluid under pressure when the engine is turned off, and discharges hydraulic fluid when the engine is restarted.

The accumulator 10 includes a housing 12 and an end cap 14 attached to one end of the housing 12. A seal 16 is disposed between the housing 12 and the end cap 14 to ensure that the housing 12 is leak free. The housing 12 is generally cylindrical in shape and includes an open end 18 and a closed end 20 opposite the open end 18. A supply line 22 is in communication with a fluid flow control device 24 which in turn is in communication with a pressure sensor 26. One end of the supply line 22 is connected to the fluid flow control device while the other end connects to a control system of an automatic transmission.

The piston 30 is located within the interior space 32 and is slidingly engaged with an inner surface 36 of the housing 12. A first outer face or surface 42 of the piston 30 and an inner surface 46 of the end cap 14 define an air filled chamber 48. A second outer face or surface 44 of the piston 30 and the inner surface 36 of the housing 12 define a fluid filled chamber 50. Accordingly, the piston 30 divides the interior space 32 of the housing 12 into the air chamber 48 and the fluid filled chamber 50. The fluid flow control device 24 and the pressure sensor 26 further communicate with the fluid filled chamber 50. FIG. 1 illustrates the piston 30 in a seated position where the second outer surface 44 of the piston 30 is seated near an end 52 of the housing 12. The piston 30 is held in the seated position against the end 52 by at least one biasing member 54. In the embodiment as shown, two biasing members 54 and 55 are employed where the biasing member 55 is contained within the biasing member 54. Each biasing member may have a different spring constant so that the overall biasing force can be optimized. Each biasing member 54, 55 includes a first end 56 and a second end 58, where the first ends 56 of the biasing members 54, 55 are engaged with the end cap 14 and the second ends 58 of the biasing members 54, 55 are engaged with the first outer surface 42 of the piston 30. The biasing members 54, 55 exert a biasing force BF in a direction towards the piston 30, thereby keeping the piston 30 seated on the end 52 of the housing 12. In the embodiment as illustrated, the biasing members 54, 55 are both coil springs, however those skilled in the art will appreciate that the piston 30 may be actuated by other approaches as well. For example, in an alternative embodiment the piston 30 is actuated by a compressive gas, such as air.

The piston 30 includes a circumferential channel or groove 60 which receives and retains a guiding ring 62. The guiding ring 62 is preferably fabricated of PTFE (Vespel) and assists in maintaining true axial orientation of the piston 34 within the housing 12. The piston 30 further includes a deeper circumferential channel or groove 64 which receives and retains a lip seal (ND ring) 66. The lip seal 66 may include a blade or wiper and functions as the primary seal between the piston 30 and the surface 36 of the housing 12. The piston 30 may also include a channel or groove 68 which receives and retains another guiding ring or bushing 70 to maintain axial orientation for an increased length (L) to diameter (D) ratio of the piston 30.

The supply line 22 and the fluid flow control device 24 define a fluid pathway into the fluid chamber 50. Specifically, fluid either enters or exits from the fluid chamber 50 through the flow control device 24. As fluid enters the fluid chamber 50, the pressure increases such that a force F is created. The force F created by the increased pressure of the fluid chamber 50 is greater than the biasing force BF. The force F exerted by the pressure of the fluid chamber 50 overcomes the biasing force BF, thereby urging the piston 30 to move in a direction towards the end cap 14. As fluid exits the fluid chamber 50, the fluid chamber 50 decreases in pressure such that the force F exerted by the fluid chamber 50 is now less than the biasing force BF, and the piston 30 is urged in a direction towards the end 52 of the housing 12 and returns to the seated position shown in FIG. 1. The desired amount of fluid entering and exiting the fluid chamber 50 is controlled by fluid flow control device 24 according to the desired pressure within the fluid chamber 50 as determined by the pressure sensor 26.

Various embodiments of the hydraulic accumulator 10 may have one or more of the following features and advantages. The piston 30 can be die cast with an integrated skirt. The biasing members 54 and 55 may be nested. The fluid flow control device 24 (which may be a solenoid) and the pressure sensor 26 are bolted to the housing 12. The charging and discharging of the accumulator 10 can occur through two separate paths. Oil flow through the flow control device 24 may occur through the same inlet and outlet. The housing 12 can be a one piece aluminum die cast and uses a precision machined piston bore. The housing 12 may be implemented as a one-piece bracket. The housing 12 may be impregnated with resin to provide zero leakage. The piston 30 may include an anodized hard coat.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic accumulator for a motor vehicle transmission, the motor vehicle including an engine operatively connected to a Pump that supplies hydraulic fluid to the transmission when the engine is operating and is idle when the engine is turned off, the hydraulic accumulator comprising:

- a housing with a first end and a second end and an interior surface that defines an interior space;
- a piston slidably disposed within the interior space of the housing, the piston including a face that with the interior surface of the housing defines a fluid chamber;

- a first biasing member that urges the piston towards the first end of the housing;
- a pressure sensor in communication with the fluid chamber; and
- a fluid control device that controls the amount of the hydraulic fluid entering and exiting the fluid chamber as the piston reciprocates within the interior space,
- wherein the amount of the hydraulic fluid entering and exiting the fluid chamber achieves a desired pressure within the fluid chamber as determined by the pressure sensor, and wherein the hydraulic accumulator collects the hydraulic fluid when the motor vehicle's engine is operating, retains the hydraulic fluid under pressure when the engine is turned off, and discharges the hydraulic fluid when the engine is restarted.

2. The hydraulic accumulator of claim 1 wherein the second end is an open end sealed closed by an end cap.

3. The hydraulic accumulator of claim 2 further comprising a seal between the second end and the end cap to ensure that the housing is leak free.

4. The hydraulic accumulator of claim 1 wherein the piston divides the interior space of the housing into the fluid chamber and an air filled chamber.

5. The hydraulic accumulator of claim 4 wherein the first biasing member resides in the air filled chamber.

6. The hydraulic accumulator of claim 4 wherein the piston includes a groove that receives a lip seal to prevent the hydraulic fluid from flowing from the fluid chamber to the air filled chamber.

7. The hydraulic accumulator of claim 1 further comprising a second biasing member that urges the piston towards the first end of the housing.

8. The hydraulic accumulator of claim 7 wherein the second biasing member is nested with the first biasing member.

9. The hydraulic accumulator of claim 7 wherein the first biasing member and the second biasing member are coil springs.

10. The hydraulic accumulator of claim 7 wherein the first biasing member has a spring constant that is different than a spring constant of the second biasing member.

11. The hydraulic accumulator of claim 1 wherein the first biasing member is a compressive gas.

12. The hydraulic accumulator of claim 11 wherein the compressive gas is air.

13. The hydraulic accumulator of claim 1 wherein the piston includes a first guide ring to maintain axial orientation of the piston within the housing.

14. The hydraulic accumulator of claim 13 wherein the piston includes a first groove that receives the first guide ring.

15. The hydraulic accumulator of claim 13 wherein the piston includes a second guide ring apart from the first guide ring to further maintain axial orientation of the piston within the housing.

16. The hydraulic accumulator of claim 15 wherein the piston includes a second groove that receives the second guide ring.

17. The hydraulic accumulator of claim 13 wherein the first guide ring is made of PTFE.

18. The hydraulic accumulator of claim 1 wherein the fluid control device is a solenoid.

19. The hydraulic accumulator of claim 1 wherein a length (L) of the piston is greater than a diameter (D) of the piston.

20. The hydraulic accumulator of claim 1 wherein the housing is made of a one-piece aluminum die casting.

* * * * *